(12) United States Patent
Abe

(10) Patent No.: US 7,791,704 B2
(45) Date of Patent: Sep. 7, 2010

(54) LIQUID CRYSTAL DISPLAY PANEL

(75) Inventor: Hideaki Abe, Chiba (JP)

(73) Assignees: IPS Alpha Technology, Ltd., Chiba (JP); Hitachi Displays, Ltd., Chiba (JP)

( * ) Notice: Subject to any disclaimer, the term of this patent is extended or adjusted under 35 U.S.C. 154(b) by 169 days.

(21) Appl. No.: 12/073,943

(22) Filed: Mar. 12, 2008

(65) Prior Publication Data
US 2008/0225221 A1   Sep. 18, 2008

(30) Foreign Application Priority Data
Mar. 16, 2007   (JP) .............................. 2007-067806

(51) Int. Cl.
*G02F 1/1339*   (2006.01)
(52) U.S. Cl. ........................ 349/153; 349/150; 349/151; 349/158
(58) Field of Classification Search ........................ None
See application file for complete search history.

(56) References Cited
FOREIGN PATENT DOCUMENTS
JP     08-129166     10/1994
JP     08-171095     12/1994

*Primary Examiner*—Richard H Kim
(74) *Attorney, Agent, or Firm*—Stites & Harbison, PLLC; Juan Carlos A. Marquez, Esq.

(57) ABSTRACT

The present invention provides a liquid crystal display panel which exhibits excellent durability by protecting portions of a substrate which are liable to be most easily cracked or chipped. In a liquid crystal display panel arranging a sealing material between a TFT substrate and a CF substrate, and holding a liquid crystal layer between the TFT substrate and the CF substrate, the CF substrate has one-side surface thereof formed in a recessed shape as viewed from above, a flexible printed circuit board is connected to a region of the TFT substrate where the CF substrate and the TFT substrate do not overlap with each other, and a sealing material is formed along a shape of the CF substrate. Portions where the TFT substrate and the CF substrate overlap with each other and correspond to both sides of the portion where the flexible printed circuit board is arranged can be formed such that the sealing material is filled in the portions with no gap.

6 Claims, 5 Drawing Sheets

# LIQUID CRYSTAL DISPLAY PANEL

CROSS-REFERENCE TO RELATED APPLICATIONS

The disclosure of Japanese Patent Application No. 2007-67806 filed on Mar. 16, 2007 including the specification, drawings and abstract is incorporated herein by reference in its entirety.

BACKGROUND

1. Field of the Invention

The present invention relates to a liquid crystal display panel being configured to sandwich liquid crystal between two substrates, and more particularly to a liquid crystal display panel which exhibits excellent durability by improving a shape of the substrate.

2. Description of Related Arts

FIG. 10 shows the constitution of a conventional liquid crystal display module.

In the conventional liquid crystal display module, a liquid crystal display panel is configured by sandwiching a liquid crystal layer not shown in the drawing between a TFT substrate 11 and a color filter substrate 12 (hereinafter referred to as a CF substrate 12). The TFT substrate 11 is larger than the CF substrate 12. Ina region of the TFT substrate 11 which does not overlap with the CF substrate 12, a driver chip 13 which controls driving of the liquid crystal display panel is arranged. Further, an upper polarizer 14 is arranged on the CF substrate 12, and a lower polarizer is also arranged on a lower side of the TFT substrate 11. Further, a backlight is arranged below the liquid crystal display panel thus constituting the liquid crystal display module.

The backlight is constituted of a light source 18 such as an LED, for example, arranged on a flexible printed circuit board 15 (hereinafter referred to as FPC 15), and a light guide plate 17 which leads light radiated from the light source 18 to the whole liquid crystal display panel. An optical sheet is arranged between the light guide plate 17 and the liquid crystal display panel. The optical sheet is formed of, for example, an upper diffusion sheet, an upper prism sheet, a lower prism sheet, a lower diffusion sheet and the like. A reflection sheet is arranged below the light guide plate 17 and plays a role of directing light led to a lower side of the light guide plate 17 toward a liquid crystal display panel side. To satisfy a demand for the reduction of thickness of the liquid crystal display device, the light guide plate 17 is configured to have a small thickness except for a light incident surface portion which faces the light source 18. The reason the light incident surface portion has a large thickness is that a size of an LED currently preferably used as the light source 18 is large and a size of the light incident surface of the light guide plate 17 is increased to conform to the size of the LED. In FIG. 10, numeral 16 indicates a mold frame. The liquid crystal display module is configured by arranging the liquid crystal display panel on an upper side of the frame-shaped mold frame 16 and by arranging the backlight on a lower side of the mold frame 16.

Although electronic parts such as capacitors and resistors besides the light source 18 are mounted on the FPC 15, these electronic parts are not shown in the drawing.

Here, as a literature which discloses a related art in which an upper substrate described later has a particular shape, patent document 1 (Japanese Patent Laid-open Hei 8-171095) is named.

SUMMARY

FIG. 11A and FIG. 11B show the constitution of a conventional liquid crystal display panel, wherein FIG. 11A shows the liquid crystal display panel as viewed from above, and FIG. 11B shows an arrangement position of a sealing material in the liquid crystal display panel shown in FIG. 11A.

As shown in FIG. 11A and FIG. 11B, in the conventional liquid crystal display panel, a TFT substrate 11 and a CF substrate 12 differ in size from each other, and a driver chip 13 and an FPC 15 are mounted on the TFT substrate 11 at a position where the TFT substrate 11 and the CF substrate 12 do not overlap with each other.

However, such a constitution inevitably brings about a drawback that a portion of the TFT substrate 11 having one-sheet-substrate structure where the TFT substrate 11 and the CF substrate 12 do not overlap with each other exhibits a poor strength. Accordingly, due to an external stress applied to the liquid crystal display module, the portion having one-sheet-substrate structure is deformed by warping or the like thus giving rise to a drawback that the driver chip or the FPC mounted on the TFT substrate 11 is peeled off leading to a display defect. As another possibility, the substrate may crack and lines on the substrate are disconnected thus giving rise to a display defect attributed to such disconnection. Further, there may also arise a drawback that the substrate chips off and a chip-off piece damages lines on the substrate and, at the same time, the chip-off piece enters the inside of the module as a foreign material thus adversely influencing the display.

It is an object of the present invention to provide a liquid crystal display panel which exhibits excellent durability.

According to one aspect of the present invention, in a liquid crystal display panel arranging a sealing material between a lower substrate formed of a TFT substrate, for example, and an upper substrate formed of a CF substrate, for example, and holding a liquid crystal layer between these substrates, the upper substrate has one-side surface thereof formed in a recessed shape as viewed from above, a flexible printed circuit board is connected to a region of the lower substrate where the upper substrate and the lower substrate do not overlap with each other, and the sealing material is formed along a shape of the upper substrate.

According to the present invention, the upper substrate is arranged to overlap with four corners of the lower substrate and the sealing material is arranged along the shape of the upper substrate and hence, it is possible to provide a liquid crystal display panel which exhibits excellent durability by protecting portions of the lower substrate which are liable to be most easily cracked or chipped.

Here, the upper substrate may be formed of a plastic substrate or a glass substrate.

By forming portions where the lower substrate and the upper substrate overlap with each other and correspond to both sides of the portion where the flexible printed circuit board is arranged such that the sealing material is filled in the portions with no gap, it is possible to provide the liquid crystal display panel exhibiting more excellent durability. In the present invention, "filled in the portions with no gap" implies that the sealing material is not arranged to form a space intentionally.

A driver chip for controlling driving of the liquid crystal display panel may be arranged on a portion of the lower substrate where the lower substrate and the upper substrate do not overlap with each other.

In this case, the flexible printed circuit board and the driver chip are arranged parallel to a side of the lower substrate to which the flexible printed circuit board is connected. Due to such a constitution, a size of a mounting area in the longitudinal direction can be decreased thus narrowing a picture frame.

Further, the flexible printed circuit board and the driver chip are arranged in parallel to each other and parallel to a side of the lower substrate to which the flexible printed circuit board is connected. Due to such a constitution, it is possible to shorten a distance between the driver chip and the FPC and hence, lines which connect the driver chip and the FPC can be shortened thus decreasing the wiring resistance.

According to the present invention, it is possible to provide a liquid crystal display panel exhibiting excellent durability.

BRIEF DESCRIPTION OF THE DRAWINGS

FIG. 3A and FIG. 3B are views for explaining a shape of a mold frame, wherein FIG. 3A shows a shape of the mold frame on a side on which the liquid crystal display module is mounted, and FIG. 3B shows a shape of the mold frame on a side on which a backlight is arranged;

FIG. 11A and FIG. 11B are views showing the constitution of the conventional liquid crystal display panel, wherein FIG. 11A is a view of a liquid crystal display panel as viewed from above, and FIG. 11B is a view showing an arrangement position of a sealing material in a liquid crystal display panel shown in FIG. 11A.

DETAILED DESCRIPTION OF THE INVENTION

The present invention is explained in detail hereinafter in conjunction with drawings.

Figure 1:
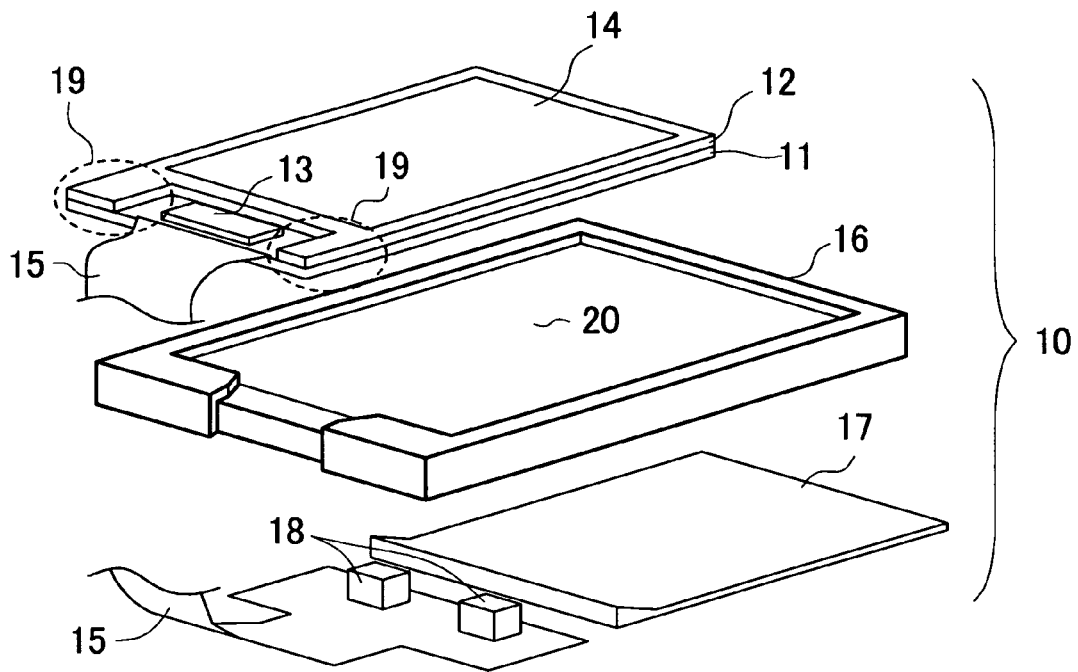
FIG. 1 shows the constitution of a liquid crystal display module according to the present invention.

FIG. 1 shows the constitution of a liquid crystal display module 10 according to the present invention.

A liquid crystal display panel is configured by overlapping with a TFT substrate 11 which is constituted of an insulating transparent substrate such as a glass substrate or a plastic substrate, for example, and a color filter substrate 12 (hereinafter, referred to as a CF substrate 12) having one-side surface thereof formed in a recessed shape as viewed from above with a liquid crystal layer sandwiched therebetween. Further, a driver chip 13 for controlling driving of the liquid crystal display panel is mounted on a portion of the TFT substrate 11 where the TFT substrate 11 and the CF substrate 12 do not overlap with each other. Further, one end of a flexible printed circuit board 15 (hereinafter, referred to as an FPC 15) is arranged on the TFT substrate 11 for supplying a signal to the driver chip 13. As shown in FIG. 1, one technical feature of the present invention lies in shapes of portions 19 where the TFT substrate 11 (lower substrate) and the CF substrate 12 (upper substrate) overlap with each other and correspond to both sides of the FPC 15 arranged on the TFT substrate 11.

Further, an upper polarizer 14 is arranged on the CF substrate 12, and a lower polarizer is also arranged on the TFT substrate 11. Here, for arranging the driver chip 13 on the TFT substrate 11, the CF substrate is smaller than the TFT substrate in size. As a matter of course, when the driver chip is arranged on the CF substrate in a state that the CF substrate is arranged on a lower side of the TFT substrate different from the constitution shown in FIG. 1, the CF substrate is larger than the TFT substrate in size.

The liquid crystal display panel is arranged on an upper side of a frame-shaped mold frame 16 having a hole 20 formed in a center portion thereof. Further, on a lower side of the mold frame 16, an optical sheet consisting of an upper diffusion sheet, an upper prism sheet, a lower prism sheet, a lower diffusion sheet and the like not shown in the drawing, a light guide plate 17 and a reflection sheet 23 are arranged in a state that these parts are sandwiched between the lower side of the mold frame 16 and a portion of another end of the above-mentioned FPC 15. A light source 18 formed of LEDs or the like are arranged on another end of the FPC 15 in a state that the light source 18 faces a side surface of the light guide plate 17 in an opposed manner.

One-side surface (incident surface) of the light guide plate 17 is arranged to face the light source 18 in an opposed manner, and the light guide plate 17 is housed in the mold frame 16 on side opposite to a side in which the liquid crystal display panel is housed. Further, the reflection sheet 23 arranged below the light guide plate 17 is configured to be adhered to the mold frame 16 using an adhesive agent formed on a periphery of the reflection sheet 23 with a positional relationship shown in FIG. 2. In general, a backlight which arranges a light source on the side surface of a light guide plate in such a manner is referred to as a "sidelight" backlight.

Figure 2:
FIG. 2 is a view showing the cross-sectional (side) constitution of the liquid crystal display module according to the present invention shown in FIG. 1.

FIG. 2 shows the cross-sectional (side) constitution of the liquid crystal display module according to the present invention shown in FIG. 1.

As shown in FIG. 2, a lower polarizer 21 is also arranged on the TFT substrate 11, and an optical sheet 22 is arranged between the light guide plate 17 and the liquid crystal display panel. Here, the reflection sheet 23 is arranged on a lower side of the light guide plate 17.

Figure 3A:
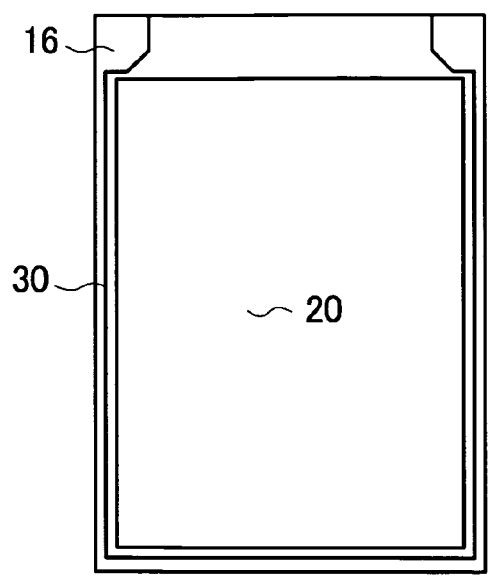
Figure 3B:
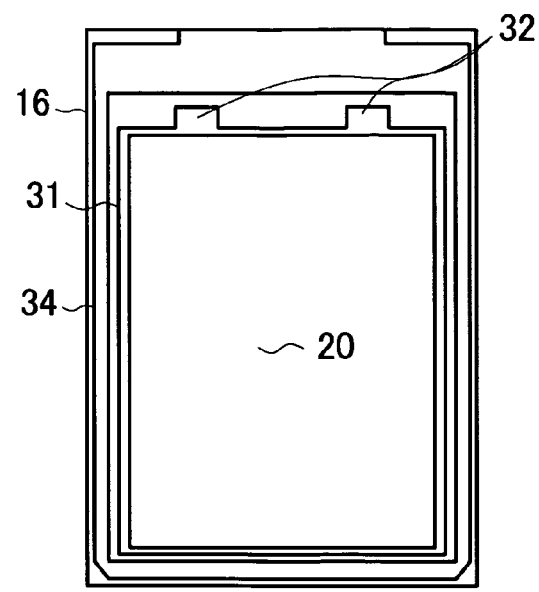

FIG. 3A and FIG. 3B are views for explaining a shape of the mold frame 16, wherein FIG. 3A shows a shape of the mold frame 16 on a side on which the liquid crystal display module is mounted, and FIG. 3B shows a shape of the mold frame 16 on a side on which the backlight is arranged.

As shown in FIG. 3A, the liquid crystal display panel is arranged along a side wall 30 formed on the mold frame 16. Further, as shown in FIG. 3B, the light guide plate 17 is arranged along a sidewall 31 formed on the mold frame 16, and the reflection sheet 23 is arranged along a side wall 34 formed on the mold frame 16. An adhesive material is formed on a peripheral side of the reflection sheet 23. By adhering the reflection sheet 23 to the mold frame 16 using the adhesive material, the backlight consisting of the light guide plate 17 and the like is housed in the inside of the mold frame 16.

In FIG. 3B, numeral 32 indicates housing portions for housing the light source formed in the mold frame 16. The housing portions 32 are formed to prevent the light source 18 formed of LEDs or the like and mounted on the FPC 15 in a state shown in FIG. 1 from being in contact with the mold frame 16.

Figure 4:
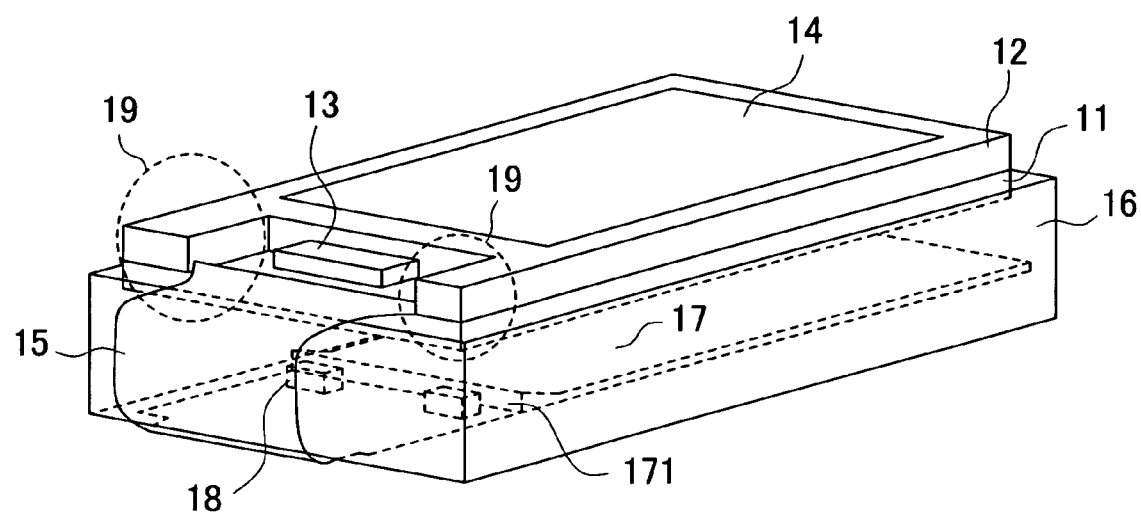
FIG. 4 is a view showing the actually-formed liquid crystal display module which is configured by arranging the liquid crystal display panel on an upper side of the mold frame and the backlight on a lower side of the mold frame.

FIG. 4 shows the actually-formed liquid crystal display module which is configured by arranging the liquid crystal display panel on an upper side of the mold frame 16 and the backlight on a lower side of the mold frame 16. As shown in FIG. 4, although the light source 18 is mounted on the FPC 15, the light source 18 is prevented from being in contact with the mold frame 16 due to the housing portions 32 formed in the mold frame 16. Numeral 171 indicates a light incident surface of the light guide plate 17 which faces the light source 18 in an opposed manner.

Figure 5A:
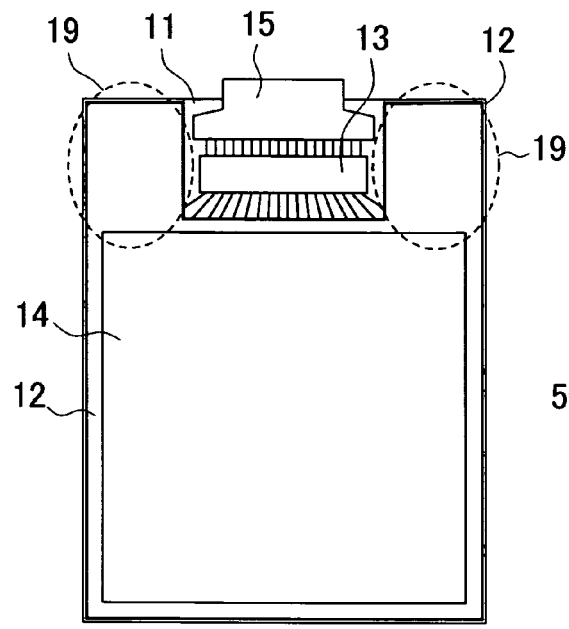
FIG. 5A is a view of the liquid crystal display panel according to the present invention as viewed from above.

FIG. 5A shows the liquid crystal display panel according to the present invention as viewed from above. As shown in FIG. 5A, the CF substrate 12 which forms one-side surface thereof in a recessed shape overlaps with the rectangular TFT substrate 11 (lower substrate). Numeral 14 indicates an upper polarizer arranged corresponding to a display region of the CF substrate 12.

Figure 5B:
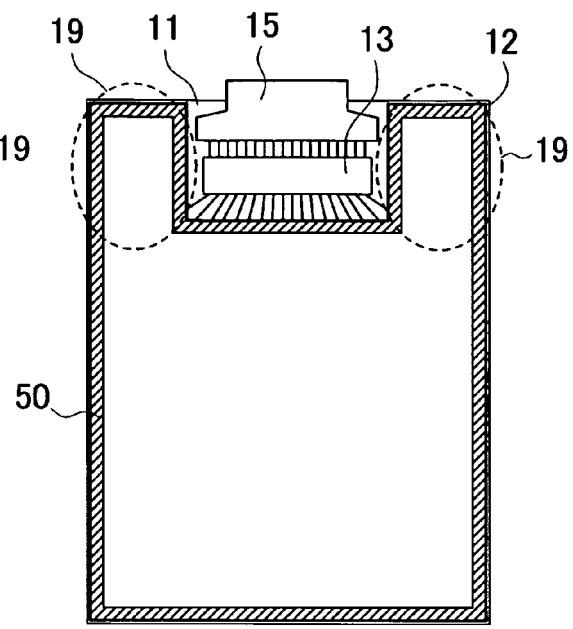
FIG. 5B is a view showing an arrangement position of a sealing material arranged between a TFT substrate and a CF substrate of the liquid crystal display panel according to the present invention.

FIG. 5B shows an arrangement position of a sealing material 50 arranged between the TFT substrate 11 and the CF substrate 12 of the liquid crystal display panel according to the present invention. As shown in FIG. 5B, one technical feature of the present invention lies in that the sealing material 50 is formed along a shape of the CF substrate 12.

Figure 11A:
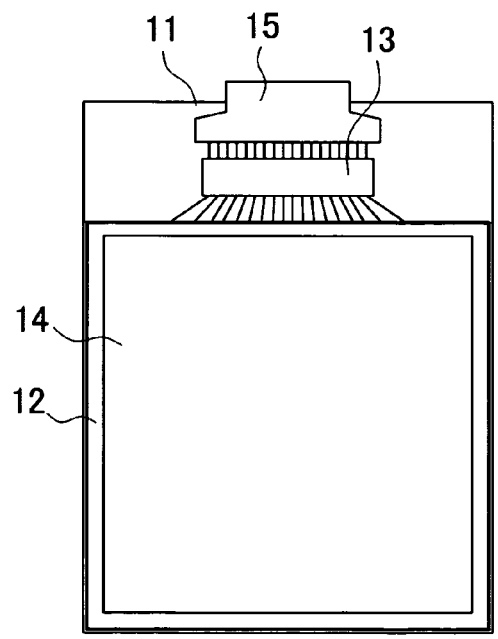
Figure 11B:
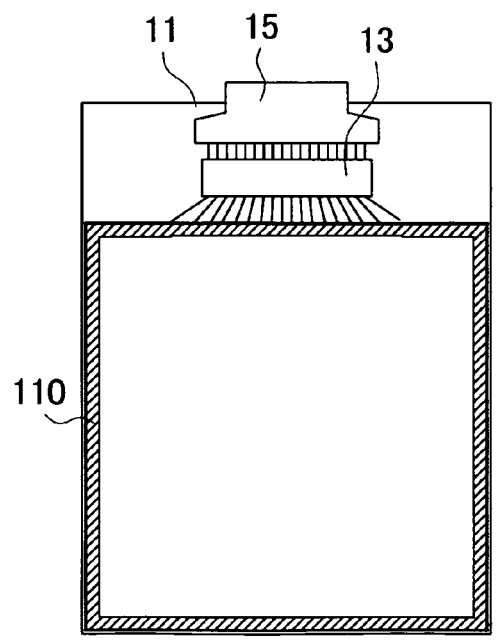

With respect to the constitution of the liquid crystal display module described in the previously mentioned patent document 1, the second substrate is arranged on the first substrate, and one-side surface of the second substrate is formed in a recessed shape. However, the sealing material arranged between the first substrate and the second substrate is formed in a rectangular frame shape as shown in FIG. 11. That is, the sealing material described in patent document 1 is not formed along a shape of the upper substrate different from the present invention.

According to the present invention, as shown in FIG. 5B, by arranging the sealing material 50 along a shape of the CF substrate 12 (upper substrate), it is possible to provide a liquid crystal display panel exhibiting excellent durability which can prevent cracking and chipping of the substrate.

Figure 6:
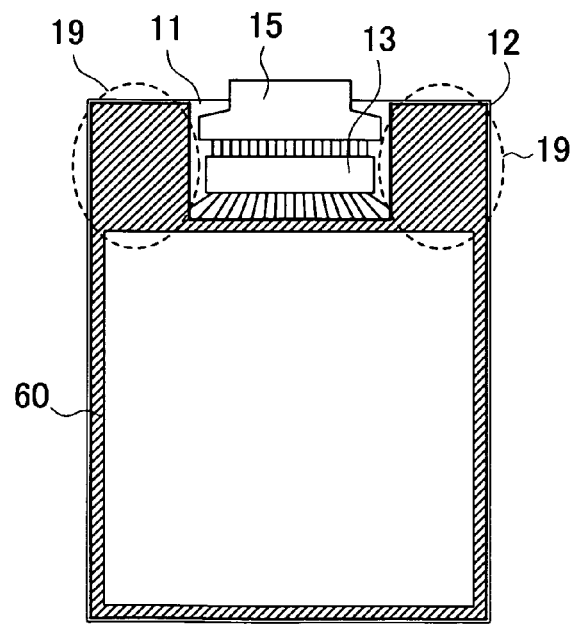
FIG. 6 shows a modification of the arrangement of the sealing material shown in FIG. 5B.

FIG. 6 shows a modification of the arrangement of the sealing material shown in FIG. 5B.

In FIG. 5B, the sealing material is arranged along the shape of the CF substrate 12. In FIG. 6, a sealing material 60 is arranged along the shape of the CF substrate 12. Further, a sealing material is filled with no gap in portions 19 which correspond to both sides of a portion of the TFT substrate 11 on which the FPC 15 is arranged and at which the TFT substrate 11 (lower substrate) and the CF substrate 12 (upper substrate) overlap with each other. Due to such a constitution, it is possible to provide a liquid crystal display panel exhibiting more excellent durability than the liquid crystal display panel having the constitution shown in FIG. 5B. Here, "filled with no gap in the portions" implies that the sealing material is not formed to form a space intentionally.

In FIG. 6, the FPC 15 and the driver chip 13 are arranged in parallel to each other and parallel to a side of the TFT substrate 11 (lower substrate) to which the FPC 15 is connected.

Due to such a constitution, it is possible to shorten a distance between the driver chip 13 and the FPC 15 and hence, lines which connect the driver chip 13 and the FPC 15 can be shortened thus decreasing the wiring resistance.

Figure 7:
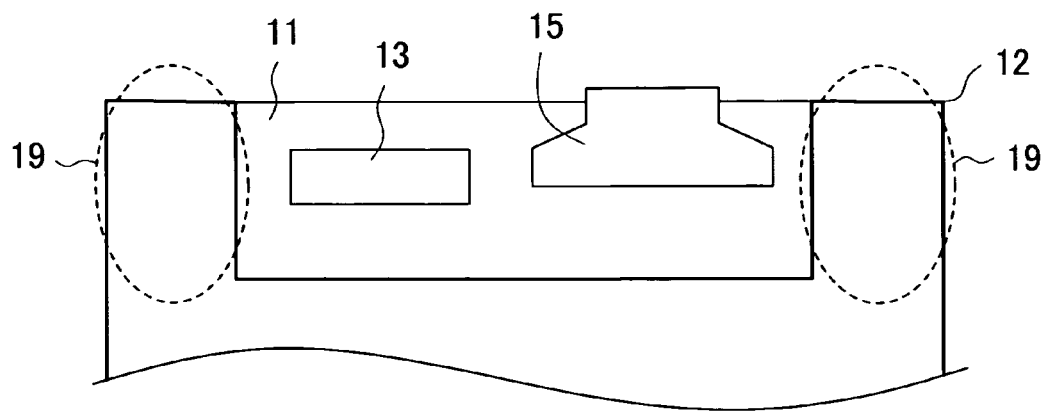
FIG. 7 shows a modification of an arrangement position of an FPC and a driver chip in a region where the TFT substrate and the CF substrate of the present invention do not overlap with each other.

FIG. 7 shows a modification of the arrangement position of the FPC 15 and the driver chip 13 in a region where the TFT substrate 11 and the CF substrate 12 of the present invention do not overlap with each other.

In FIG. 7, the FPC 15 and the driver chip 13 are arranged parallel to a side of the TFT substrate 11 (lower substrate) to which the FPC 15 is connected. Due to such a constitution, a size of a mounting area in the longitudinal direction can be decreased thus narrowing a picture frame.

Figure 8:
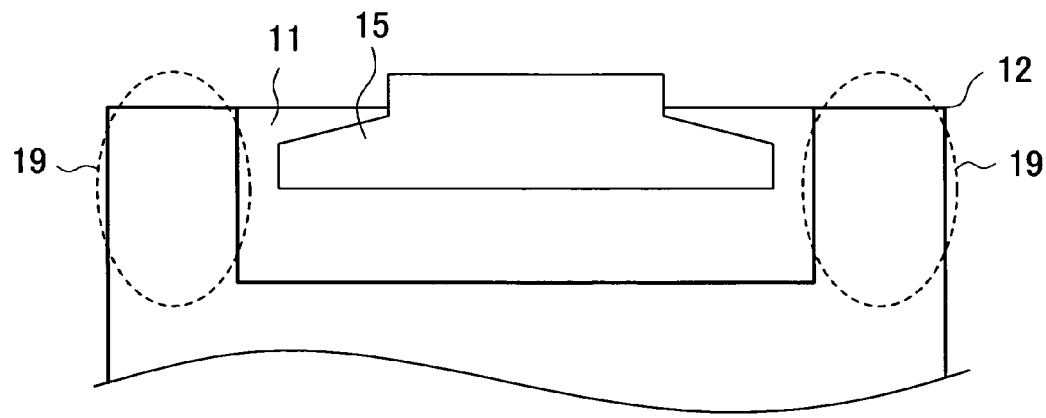
FIG. 8 shows another modification of the arrangement of the FPC in a region where the TFT substrate and the CF substrate of the present invention do not overlap with each other.

FIG. 8 shows another modification of the arrangement of the FPC 15 in a region where the TFT substrate 11 and the CF substrate 12 of the present invention do not overlap with each other.

In FIG. 8, in the region where the TFT substrate 11 and the CF substrate 12 do not overlap with each other, the driver chip is not arranged and only the FPC 15 is connected to the TFT substrate 11 (lower substrate). Due to such a constitution, by an amount corresponding to non-mounting of the driver chip, the size of the mounting area in the longitudinal direction can be further decreased thus making the liquid crystal display module more compact.

Figure 9:
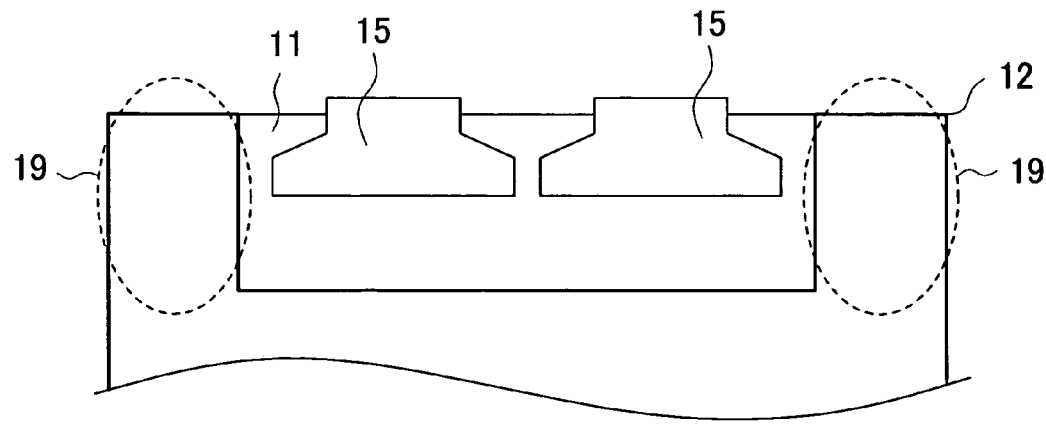
FIG. 9 shows still another modification of the arrangement of the FPC in a region where the TFT substrate and the CF substrate of the present invention do not overlap with each other.
Figure 10:
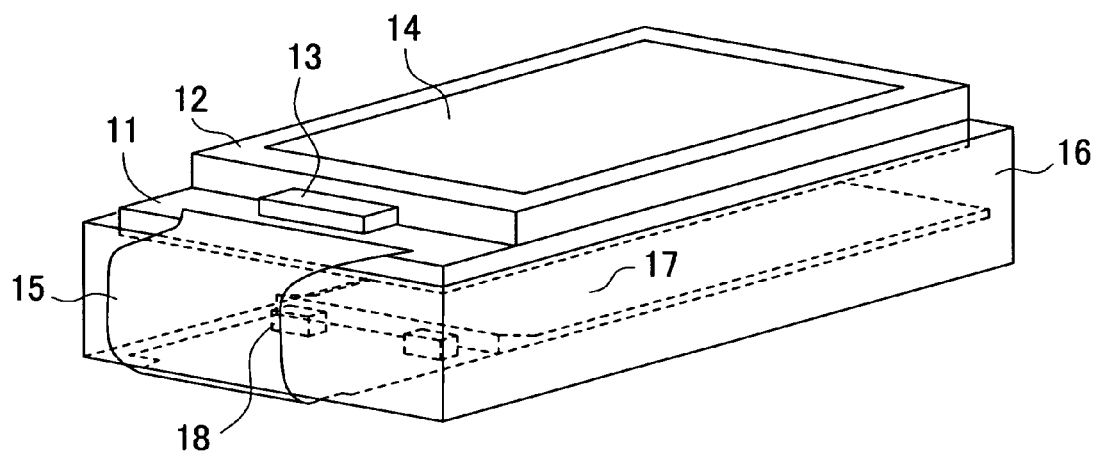
FIG. 10 is a view showing the constitution of a conventional liquid crystal display module.

FIG. 9 shows still another modification of the arrangement of the FPC 15 in a region where the TFT substrate 11 and the CF substrate 12 of the present invention do not overlap with each other.

In FIG. 9, in the region where the TFT substrate 11 and the CF substrate 12 do not overlap with each other, the driver chip is not arranged and only a plurality of FPCs 15 (two FPCs in FIG. 9) is connected to the TFT substrate 11 (lower substrate). Due to such a constitution, a size of the FPC can be decreased and hence, a layout efficiency of a sheet for manufacturing FPCs can be enhanced whereby an FPC material cost can be lowered due to the increase of the number of FPCs which can be mounted.

Although the present invention has been explained by taking the example which uses the TFT substrate as the lower substrate and the CF substrate as the upper substrate, the present invention is, as a matter of course, applicable to the constitution (CF on TFT) which integrally forms a CF substrate on a TFT substrate. That is, the present invention is applicable to any constitution which holds a liquid crystal layer between two substrates.

According to the present invention, the CF substrate which constitutes the upper substrate is configured to form one-side surface thereof in a recessed shape. However, when the CF substrate is formed of a glass substrate, for example, such a recessed constitution can be formed by cutting the glass substrate using a laser. Further, when the CF substrate is formed of a plastic substrate, for example, such a recessed constitution can be formed using a rotary cutter or a punching press.

The invention claimed is:

1. A liquid crystal display panel arranging a sealing material between a lower substrate and an upper substrate, and holding a liquid crystal layer between the lower substrate and the upper substrate, wherein the upper substrate has one-side surface thereof formed in a recessed shape as viewed from above, a flexible printed circuit board is connected to a region of the lower substrate where the upper substrate and the lower substrate do not overlap with each other, the sealing material is formed along a shape of the upper substrate that includes the recessed shape, and a width of the sealing material at a first portion that is formed along the recessed shape is wider than a width of a second portion of the sealing material that is not formed along the recessed shape.

2. A liquid crystal display panel according to claim 1, wherein the upper substrate is formed of a plastic substrate or a glass substrate.

3. A liquid crystal display panel according to claim 1, wherein portions where the lower substrate and the upper substrate overlap with each other and correspond to both sides of the portion where the flexible printed circuit board is arranged are formed such that the sealing material is filled in the portions with no gap.

4. A liquid crystal display panel according to claim 1, wherein a driver chip for controlling driving of the liquid crystal display panel is arranged on the lower substrate where the lower substrate and the upper substrate do not overlap with each other.

5. A liquid crystal display panel according to claim 4, wherein the flexible printed circuit board and the driver chip are arranged parallel to a side surface of the lower substrate.

6. A liquid crystal display panel according to claim 4, wherein the flexible printed circuit board and the driver chip are arranged in parallel to each other and parallel to a side of the lower substrate.

* * * * *

UNITED STATES PATENT AND TRADEMARK OFFICE
CERTIFICATE OF CORRECTION

| | | |
|---|---|---|
| PATENT NO. | : 7,791,704 B2 | Page 1 of 1 |
| APPLICATION NO. | : 12/073943 | |
| DATED | : September 7, 2010 | |
| INVENTOR(S) | : Abe | |

It is certified that error appears in the above-identified patent and that said Letters Patent is hereby corrected as shown below:

Title Page;
On the face of the patent, Under Item (73) please amend the Assignee from –IPS Alpha Technology , Ltd., Chiba (JP) and Hitachi Displays, Ltd., Chiba (JP).—to "Hitachi Displays, Ltd., Chiba (JP)"

Signed and Sealed this
Thirteenth Day of September, 2011

David J. Kappos
*Director of the United States Patent and Trademark Office*